United States Patent
Chen et al.

(10) Patent No.: US 7,276,875 B1
(45) Date of Patent: Oct. 2, 2007

(54) MULTIMODE INTEGRATED MODULATION CIRCUIT FOR CONTROLLING FAN ROTATING SPEED

(75) Inventors: Chao-Ching Chen, Fengshan (TW); Hsin-mao Hsieh, Pingtung (TW)

(73) Assignee: Adda Corporation, Pingtung (TW)

( * ) Notice: Subject to any disclaimer, the term of this patent is extended or adjusted under 35 U.S.C. 154(b) by 0 days.

(21) Appl. No.: 11/430,926

(22) Filed: May 10, 2006

(51) Int. Cl.
*G05B 11/28* (2006.01)

(52) U.S. Cl. ............... 318/599; 388/800; 388/811; 388/907.5

(58) Field of Classification Search ........... 318/461, 318/599, 811; 388/800, 804, 811, 907.5
See application file for complete search history.

(56) References Cited

U.S. PATENT DOCUMENTS

| | | | | |
|---|---|---|---|---|
| 4,856,078 A | * | 8/1989 | Konopka | 388/831 |
| 6,037,732 A | * | 3/2000 | Alfano et al. | 318/471 |
| 6,650,074 B1 | * | 11/2003 | Vyssotski et al. | 318/254 |
| 2003/0198464 A1 | * | 10/2003 | Horng et al. | 388/831 |

* cited by examiner

*Primary Examiner*—Rina Duda
(74) *Attorney, Agent, or Firm*—Troxell Law Office, PLLC

(57) ABSTRACT

A multimode integrated modulation circuit for controlling the fan rotating speed mainly includes a voltage regulating circuit, an integrated modulation circuit and a fan motor driving circuit. The voltage regulating circuit is used to receive an external voltage signal and regulate the external voltage signal to a suitable range of workable voltage and then a first output voltage is generated. The integrated modulation circuit that is electrically connected with the voltage regulating circuit is used to receive a PWM signal with a duty cycle and a second output voltage is accordingly generated depending on the product of the duty cycle of PWM signal and the first output voltage. The fan motor driving circuit is used to receive the second output voltage and decide the fan motor rotating speed depending on the second output voltage. Therefore, the present invention substantially adopts low-price circuit elements to integrate voltage regulating mode and PWM mode for controlling the fan rotating speed.

20 Claims, 2 Drawing Sheets

MULTIMODE INTEGRATED MODULATION CIRCUIT FOR CONTROLLING FAN ROTATING SPEED

FIELD OF THE INVENTION

The present invention is relating to a fan rotating speed controlling circuit, more particularly to a multimode integrated modulation circuit for controlling the fan rotating speed by integrating voltage regulating mode and PWM (Pulse Width Modulation) mode.

BACKGROUND OF THE INVENTION

In general, there are two modes for controlling the fan rotating speed, one is voltage regulating mode and the other one is PWM mode. The voltage regulating mode is to control the fan rotating speed by utilizing a stable external voltage signal, wherein a relation between voltage and rotating speed may be showed as a curve in figure. PWM mode is to control the fan rotating speed by means of a PWM signal with a duty cycle to drive transistor switch to control the fan rotating speed, wherein the fan rotating speed will be decided depending on the duty cycle. However, if the two control modes as described above can be integrated to use, then the workable bandwidth will be increased and the problem that known driver IC is limited at a narrow bandwidth to apply can be solved practically. Referring to FIG. 1, a known fan rotating speed control circuit 10 comprises a driver IC 11, a Hall element 12, a first transistor 13, a second transistor 14 and a stator coil 15. The driver IC 11 can control the fan rotating speed only by PWM signal and the range of the workable bandwidth is relatively narrow.

SUMMARY

A primary objective of the present invention is to provide a multimode integrated modulation circuit for controlling the fan rotating speed, which employs the low-price circuit elements to integrate the voltage regulating mode and PWM mode for controlling the fan rotating speed. Modulating the external voltage signal while the duty cycle of PWM signal is constant may control the fan rotating speed. On the contrary, while the external voltage signal is constant, the duty cycle of PWM signal can be modulated to control the fan rotating speed. Besides, it is possible to simultaneously modulate both the external voltage signal and the duty cycle of PWM signal to control the fan rotating speed and thus broaden workable bandwidth.

A secondary objective of the present invention is to provide a multimode integrated modulation circuit for controlling the fan rotating speed, which has a switch to receive a PWM signal with a duty cycle. The duty cycle of PWM signal can be utilized to control the switch and the switch can be a MOSFET or a bipolar transistor.

The present invention of the multimode integrated modulation circuit for controlling the fan rotating speed includes a voltage regulating circuit, an integrated modulation circuit and a fan motor driving circuit. The voltage regulating circuit further has a voltage input end, an OP amplifier and a first voltage output end. The voltage input end receives an external voltage signal and the external voltage signal is regulated to a suitable range of workable voltage via the OP amplifier, then a first output voltage is generated and output via the first voltage output end. The integrated modulation circuit is electrically connected with the first voltage output end and utilized to receive a PWM signal with a duty cycle, and accordingly a second output voltage which is the product of the duty cycle of PWM signal and the first output voltage is generated. The fan motor driving circuit is utilized to receive the second output voltage and determine fan motor rotating speed depending on the second output voltage.

DETAILED DESCRIPTION OF THE PRESENT INVENTION

Figure 1:
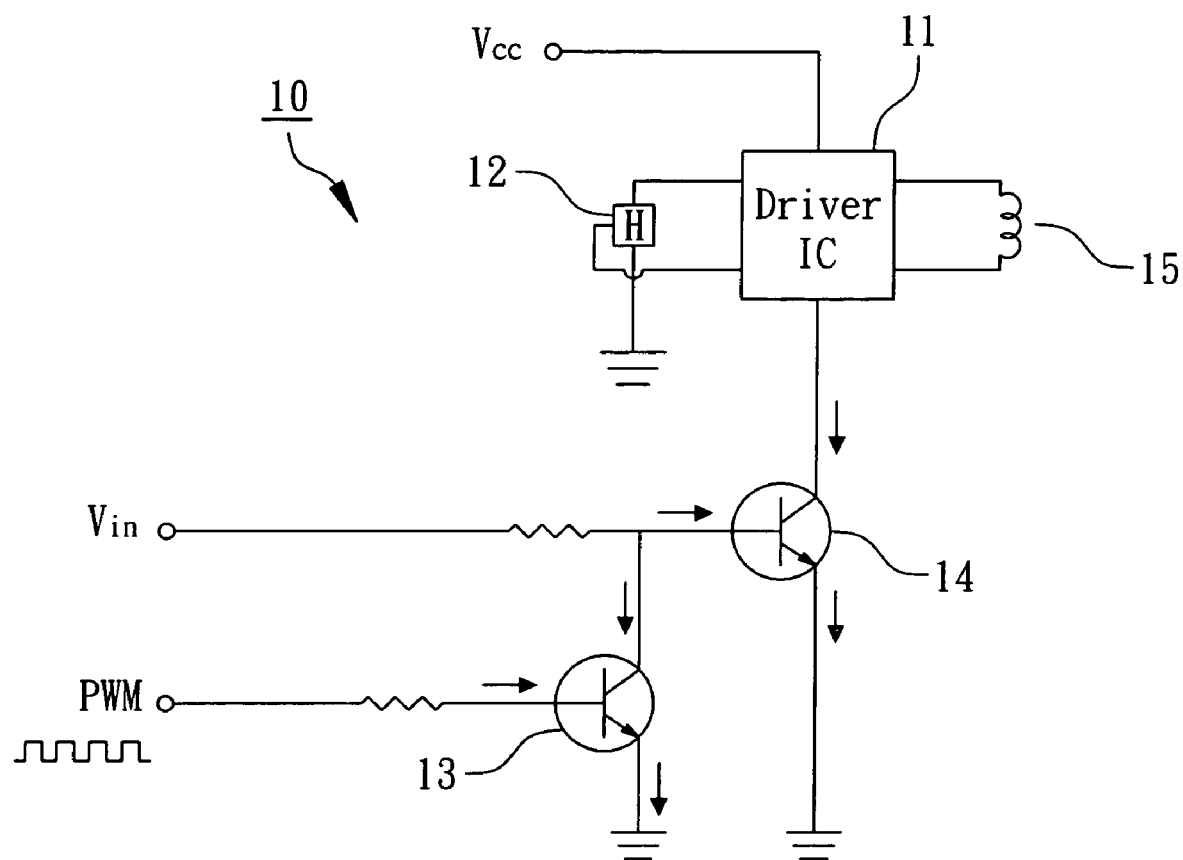
FIG. 1 is a diagram showing known fan speed control circuit.

Referring to the drawings attached, the present invention will be described by means of the embodiments below.

Figure 2:
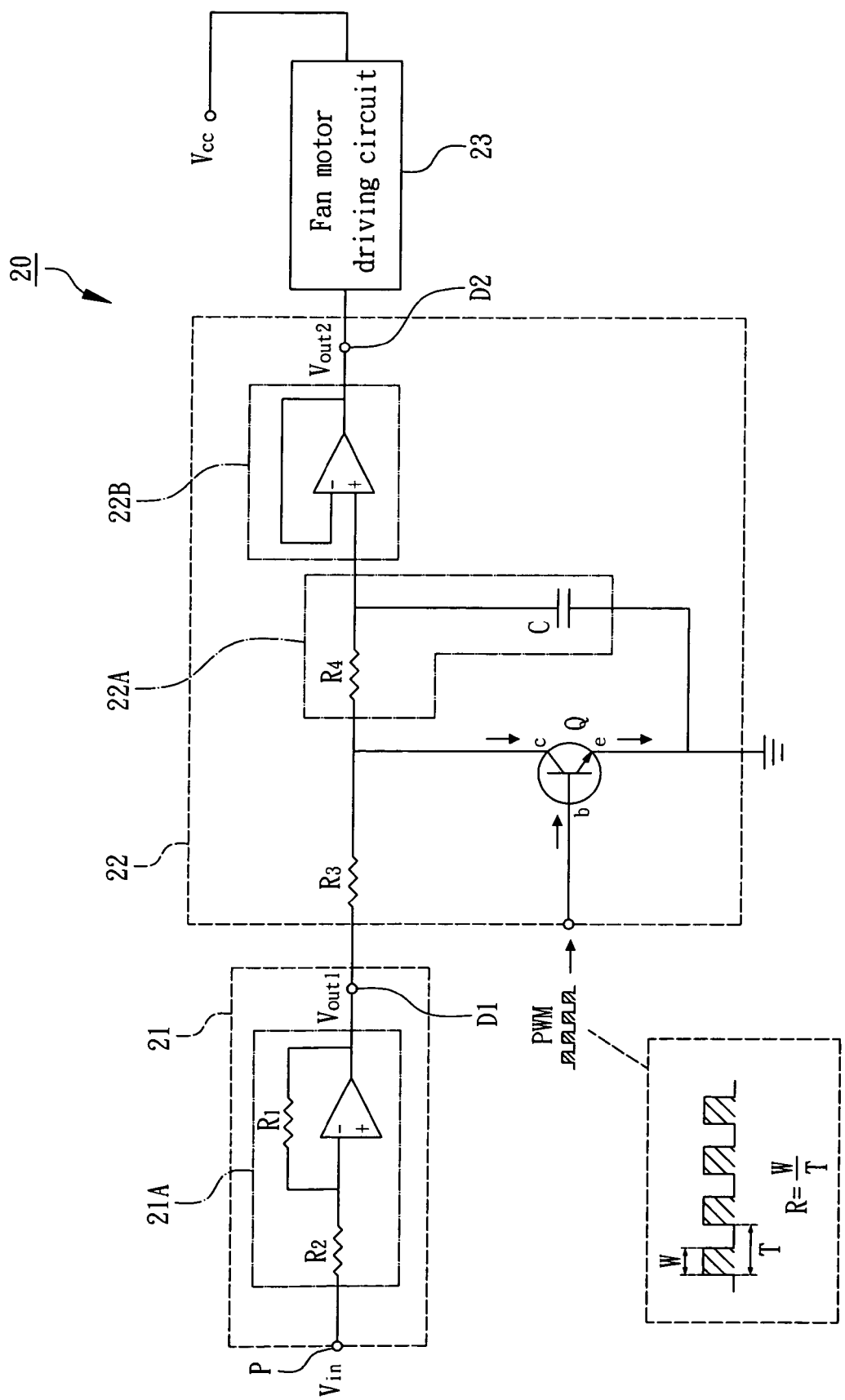
FIG. 2 is a diagram showing a multimode integrated modulation circuit for controlling the fan rotating speed in accordance with the present invention.

In accordance with one embodiment of the present invention and referring to FIG. 2, a multimode integrated modulation circuit 20 for controlling the fan rotating speed includes a voltage regulating circuit 21, an integrated modulation circuit 22 and a fan motor driving circuit 23. The voltage regulating circuit 21 further has a voltage input end P, an OP amplifier 21A and a first voltage output end D1. The voltage input end P is used to receive an external voltage signal Vin and regulate the external voltage signal Vin to a suitable range of workable voltage via the OP amplifier 21A, then a first output voltage Vout1 is generated and output via the first voltage output end D1. In this embodiment, the OP amplifier 21A has a first resistor R1 and a second resistor R2 and an amplification gain of the OP amplifier 21A is determined depending on the ratio of the first resistor R1 and the second resistor R2.

The integrated modulation circuit 22 has a switch Q, a low pass filter circuit 22A, a buffer 22B and a second voltage output end D2. The collector c of the switch Q is electrically connected with the first voltage output end D1 via a third resistor R3, the emitter e of the switch Q is grounded and the base b of the switch Q is utilized to receive a PWM signal with a duty cycle R. The duty cycle R, which is the ratio (W/T) of the pulse width W of PWM signal and pulse period T of PWM signal and has a range between 0 to 100%, can be used to control the switch Q. Also, a second output voltage Vout2, which is the product of the duty cycle R of PWM signal and the first output voltage Vout1, is generated accordingly. The low pass filter circuit 22A that is composed of a fourth resistor R4 and a capacitor C is utilized to stabilize the second output voltage Vout2 for reaching a stable voltage output. Then, the stable second output voltage Vout2 achieves impedance matching while it crosses the buffer 22B and outputs via the second voltage output end D2. In this embodiment, the low pass filter circuit 22A is electrically connected with the third resistor R3 via the fourth resistor R4 and is electrically connected with the emitter e of the switch Q via the capacitor C and also is grounded. In general, the switch Q may be a MOSFET or a bipolar transistor.

The fan motor driving circuit 23 is utilized to receive the second output voltage Vout2 which outputs via the second voltage output end D2 and then the fan motor rotating speed is determined depending on the second output voltage Vout2. In this embodiment, when the input end of the fan motor driving circuit 23 has a low impedance, in order to prevent the second output voltage Vout2 that inputs into the fan motor driving circuit 23 from reflection or loss with respect to signal caused by impedance mismatch, a low impedance is provided at the buffer 22B of the integrated modulation circuit 22 to match the impedance between the second voltage output end D2 and the input end of the fan motor driving circuit 23. Alternatively, while the input end of the fan motor driving circuit 23 has a high resistance, the buffer 22B of the integrated modulation circuit 22 can be omitted.

The multimode integrated modulation circuit in accordance with the present invention substantially adopts the low-price circuit elements to integrate voltage regulating mode and PWM mode for controlling the fan rotating speed. When the duty cycle R of PWM signal is constant, the fan rotating speed can be controlled by means of regulating the external voltage signal Vin. On the contrary, when the external voltage signal Vin is constant, the fan rotating speed can be controlled by means of regulating the duty cycle R of PWM signal. Furthermore, it is capable to simultaneously regulate both the external voltage signal Vin and the duty cycle R of PWM signal to control the fan rotating speed and thus broaden workable bandwidth.

While the present invention has been particularly illustrated and described in detail with respect to the preferred embodiments thereof, it will be clearly understood by those skilled in the art that various changed in form and details may be made without departing from the spirit and scope of the present invention.

What is claimed is:

1. A multimode integrated modulation circuit for controlling fan rotating speed comprising:
   a voltage regulating circuit having a voltage input end, an OP amplifier and a first voltage output end, wherein the voltage input end is utilized to receive an external voltage signal and regulate the external voltage signal to a suitable range of workable voltage via the OP amplifier, then a first output voltage is generated and output via the first voltage output end;
   an integrated modulation circuit electrically connected with the first voltage output end, wherein the integrated modulation circuit is utilized to receive a PWM signal with a duty cycle and a second output voltage is generated depending on the product of the duty cycle of PWM signal and the first output voltage; and
   a fan motor driving circuit utilized to receive the second output voltage, wherein the fan motor rotating speed is determined depending on the second output voltage.

2. The multimode integrated modulation circuit for controlling fan rotating speed in accordance with claim 1, wherein the OP amplifier further has a first resistor and a second resistor and an amplification gain of the OP amplifier is determined depending on the ratio of the first resistor and the second resistor.

3. The multimode integrated modulation circuit for controlling fan rotating speed in accordance with claim 1, wherein the duty cycle of PWM signal can be regulated between 0 to 100%.

4. The multimode integrated modulation circuit for controlling fan rotating speed in accordance with claim 1, wherein the integrated modulation circuit has a switch, a low pass filter circuit and a second voltage output end.

5. The multimode integrated modulation circuit for controlling fan rotating speed in accordance with claim 4, wherein the switch may be a MOSFET or a bipolar transistor.

6. The multimode integrated modulation circuit for controlling fan rotating speed in accordance with claim 4, wherein the switch is electrically connected with the first voltage output end.

7. The multimode integrated modulation circuit for controlling fan rotating speed in accordance with claim 4, wherein the low pass filter circuit is composed of a fourth resistor and a capacitor.

8. The multimode integrated modulation circuit for controlling fan rotating speed in accordance with claim 4, wherein the low pass filter circuit stabilizes the second output voltage.

9. The multimode integrated modulation circuit for controlling fan rotating speed in accordance with claim 4, wherein the second output voltage is output via the second voltage output end.

10. The multimode integrated modulation circuit for controlling fan rotating speed in accordance with claim 4, wherein a buffer is disposed between the low pass filter circuit and the second voltage output end to provide a low impedance at the second voltage output end.

11. The multimode integrated modulation circuit for controlling fan rotating speed in accordance with claim 1, wherein the fan rotating speed can be controlled by means of simultaneously regulating both the external voltage signal and the duty cycle of PWM signal.

12. A multimode integrated modulation circuit for controlling fan rotating speed comprising:
    a voltage regulating circuit receiving an external voltage signal and generating a first output voltage;
    an integrated modulation circuit receiving the first output voltage and a PWM signal with a duty cycle, wherein a second output voltage is generated depending on the product of the duty cycle of PWM signal and the first output voltage; and
    a fan motor driving circuit utilized to receive the second output voltage, wherein the fan motor rotating speed is determined depending on the second output voltage.

13. The multimode integrated modulation circuit for controlling fan rotating speed in accordance with claim 12, wherein the voltage regulating circuit is an OP amplifier, the OP amplifier has a first resistor and a second resistor and an amplification gain of the OP amplifier is determined depending on the ratio of the first resistor and the second resistor.

14. The multimode integrated modulation circuit for controlling fan rotating speed in accordance with claim 12, wherein the duty cycle of PWM signal can be regulated between 0 to 100%.

15. The multimode integrated modulation circuit for controlling fan rotating speed in accordance with claim 12, wherein the integrated modulation circuit has a switch, a low pass filter circuit and a second voltage output end.

16. The multimode integrated modulation circuit for controlling fan rotating speed in accordance with claim 15, wherein the switch can be a MOSFET or a bipolar transistor.

17. The multimode integrated modulation circuit for controlling fan rotating speed in accordance with claim 15, wherein the low pass filter circuit is composed of a fourth resistor and a capacitor.

18. The multimode integrated modulation circuit for controlling fan rotating speed in accordance with claim 15, wherein the second output voltage is output via the second voltage output end.

19. The multimode integrated modulation circuit for controlling fan rotating speed in accordance with claim 15, wherein a buffer is disposed between the low pass filter circuit and the second voltage output end to provide a low impedance at the second voltage output end.

20. The multimode integrated modulation circuit for controlling fan rotating speed in accordance with claim 12, wherein the fan rotating speed may be controlled by means of simultaneously regulating both the external voltage signal and the duty cycle of PWM signal.

* * * * *